United States Patent
Wang et al.

(10) Patent No.: US 9,977,554 B2
(45) Date of Patent: May 22, 2018

(54) TOUCH DISPLAY PANEL

(71) Applicant: InnoLux Corporation, Miao-Li County (TW)

(72) Inventors: Tsung-Yu Wang, Miao-Li County (TW); Pei-Chieh Chen, Miao-Li County (TW); Chao-Hsiang Wang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 160 days.

(21) Appl. No.: 15/183,933

(22) Filed: Jun. 16, 2016

(65) Prior Publication Data

US 2016/0378225 A1 Dec. 29, 2016

(30) Foreign Application Priority Data

Jun. 23, 2015 (TW) .............................. 104120106 A

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC combination set(s) only.
See application file for complete search history.

(56) References Cited

U.S. PATENT DOCUMENTS

2005/0112544 A1* 5/2005 Xu .......................... C12M 23/12
435/4

* cited by examiner

*Primary Examiner* — Van N Chow
(74) *Attorney, Agent, or Firm* — McClure, Qualey & Rodack, LLP

(57) ABSTRACT

A touch display panel includes a substrate, a first electrode layer, and a second electrode layer. The first and second electrode layers are disposed on the substrate. The second electrode layer electrically connects to the first electrode layer and includes a plurality of sensing electrodes. Each sensing electrode includes a plurality of first conductive lines and a plurality of second conductive lines connected to each other. The first and second conductive lines are respectively arranged along first and second directions, wherein the second direction is different from the first direction. In one of two adjacent sensing electrodes, the outermost first conductive line has at least one first edge and at least one second edge connected to the first edge. The first edge corresponds to one of the second conductive lines of the other one of the two adjacent sensing electrodes, and has a curved shape.

10 Claims, 13 Drawing Sheets

TOUCH DISPLAY PANEL

CROSS REFERENCE TO RELATED APPLICATIONS

The present application claims priority of Taiwan Patent Application No. 104120106, filed on Jun. 23, 2015, the entirety of which is incorporated by reference herein.

BACKGROUND OF THE INVENTION

Field of the Invention

The present application relates to a touch technology, and in particular to an In-cell touch display panel.

Description of the Related Art

Touch panel technology nowadays is variously developed, wherein the capacitive touch panel has become the mainstream touch technology used in middle and high-end consumer electronic products because it has high accuracy, multi-touch functionality, and high touch resolution.

Integrated touch display panels are usually divided into three types according to the integration method of the touch sensing electrodes and display panel. One type is the touch sensing electrodes being formed on the outer surface of the display panel (referred to as an On-cell touch display panel), for example, the touch sensing electrodes are formed on one side of a color filter substrate toward the user. Another type is the touch sensing electrodes being formed on a touch panel and bonded to the display panel (referred to as an Out-cell touch display panel), which has a greater thickness. The third type is the display pixel (laminated) structure of the display panel being shared with the touch sensing electrodes, for example, the common electrodes of the display panel are used as the touch sensing electrodes (referred to as an In-cell touch display panel), which has a higher integration and smaller thickness.

Owing to the advantages of smaller thickness and higher integration (with the display panel), the In-cell touch display panel is emphatically being developed by various competitors.

BRIEF SUMMARY OF THE INVENTION

An object of the invention is to provide an In-cell touch display panel which can improve the drive capability and the sensing sensitivity of the touch sensing electrodes thereof.

An embodiment of the invention provides a touch display panel, including a substrate, a first electrode layer disposed on the substrate, and a second electrode layer disposed on the substrate and connected to the first electrode layer. The second electrode layer includes a plurality of sensing electrodes, and each sensing electrode includes a plurality of first conductive lines and a plurality of second conductive lines connected with each other. The first conductive lines are extending along a first direction, and the second conductive lines are extending along a second direction, different from the first direction. Moreover, the outermost first conductive line of one of two adjacent sensing electrodes has at least one first edge and at least one second edge connected with the first edge, and the first edge corresponds to one of the second conductive lines of the other one of the two adjacent sensing electrodes, wherein the first edge has a curved shape.

In some embodiments, the first edge has a first maximum length in the first direction, and the second conductive line corresponding to the first edge has a line width that is different from the first maximum length.

In some embodiments, the line width is less than the first maximum length.

In some embodiments, a protruding or depressed portion of the first edge relative to the second edge has a second maximum height in the second direction, and the outermost first conductive line has a line width that is greater than the second maximum height.

In some embodiments, the first edge has a first maximum length in the first direction, and the second conductive line corresponding to the first edge has a line width that equals the first maximum length. Moreover, the protruding or depressed portion of the first edge relative to the second edge in the second direction has a second maximum height, and the outermost first conductive line has a line width that is greater than the second maximum height.

In some embodiments, the outermost first conductive line of one of two adjacent sensing electrodes further has a plurality of first edges and a plurality of second edges, and the first edges and the second edges are arranged alternatively and connected with each other.

In some embodiments, the first edges correspond to the second conductive lines of the other one of the two adjacent sensing electrode.

In some embodiments, the outermost first conductive line of one of two adjacent sensing electrodes further has a plurality of first edges and a plurality of second edges. The first edges are adjacent to and connected with each other, and the second edges are used as connections between the first edges and are protruding relative to the first edges in the second direction, wherein the connections and the first edges are alternatively connected with each other.

In some embodiments, the second conductive line corresponding to the first edge has a curved edge.

In some embodiments, the first electrode layer comprises a transparent conductive material, and the second electrode layer comprises a metal material.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
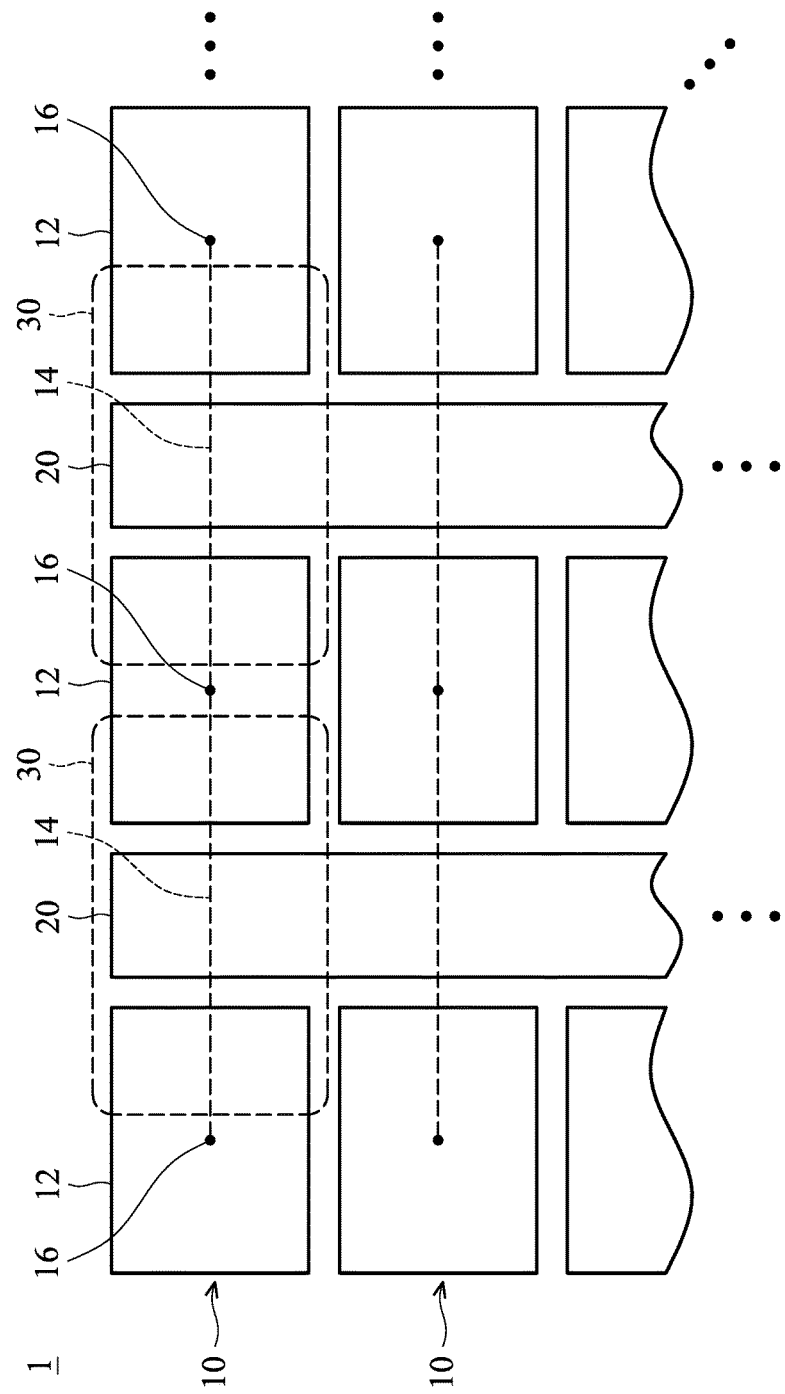
FIG. 1 is a schematic top view of a touch unit of a touch display panel in accordance with an embodiment of the invention.

In order to illustrate the purposes, features, and advantages of the invention, the preferred embodiments and figures of the invention are shown in detail as follows.

In the following detailed description, the orientations of "on", "over", "under", and "below" are used for representing the relationship between the relative positions of each element as illustrated in the drawings, and are not meant to limit the invention. Moreover, the formation of a first material layer over or on a second material layer in the description that follows may include embodiments in which the first and second material layers are formed in direct contact, or the first and second material layers have one or more additional material layers formed therebetween.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

It should be noted that an object of the invention is to provide an In-cell touch display panel which can improve the drive capability and the sensing sensitivity of the touch sensing electrodes thereof.

In an In-cell touch display panel, the touch sensing structure are integrated into the display pixel (laminated) structure of the display panel. In other words, the original structure of the display panel is appropriately designed and changed to a structure with display and touch sensing functions together. For example, as the display panel is a Fringe-Field Switching (FFS) mode display panel, the common electrodes thereof can be used as a part of the touch sensing structure. It should be realized that the display pixel (laminated) structure is usually formed of conductive materials (such as metal, transparent conductor), semiconductor materials (such as Poly-silicon), and dielectric materials (such as silicon dioxide ($SiO_2$)) by deposition, masking, etching, and doping processes etc. Moreover, some elements formed within the display pixel structure can be used as the display system circuit of the touch display panel for generating images on the monitor of consumer electronics products, and some other elements can be used as the touch sensing system circuit of the touch display panel for detecting one or more touch positions on the monitor or close to the monitor.

FIG. 1 is a schematic top view of a touch unit of a touch display panel 1 in accordance with an embodiment of the invention. A FFS mode display panel is used here as an example and is not meant to limit the invention. In the touch display panel 1, the common electrodes are grouped to form a plurality of touch sensing electrodes, and the touch sensing electrodes are electrically connected to form a mutual-capacitive touch sensing structure. As shown in FIG. 1, the touch sensing electrodes include a plurality of driving electrode units 10 and a plurality of sensing electrode units 20. The driving electrode units 10 are arranged in several rows and the sensing electrode units 20 are arranged in several columns (they are perpendicular to each other), but the invention is not limited thereto. Specifically, each driving electrode unit 10 consists of a plurality of driving electrode portions 12, and the driving electrode portions 12 are electrically connected by a plurality of connecting lines 14 (as shown by dotted lines) and connecting points 16. The connecting lines 14 cross the sensing electrode units 20 without connecting to the sensing electrode units 20.

Accordingly, the driving electrode units 10 and the sensing electrode units 20 can generate a fringing-capacitance effect therebetween, thus forming a plurality of touch sensing nodes 30 (also known as touch pixels) of the touch display panel 1. For example, by providing a driving signal (such as a AC waveform) to excite a driving electrode unit 10, the driving electrode unit 10 and its adjacent sensing electrode unit 20 can create a mutual-capacitance between the row and column of a touch pixel 30. When an object (such as a finger or conductive stylus) is close to the touch pixel 30, some charge between the row and column of the touch pixel 30 may couple with the object, such that the electric lines crossing the row and column of the touch pixel 30 is reduced and the voltage waveform coupling with the touch pixel 30 is changed (for example, becomes smaller). Therefore, the touch position of the object can be detected.

Figure 2:
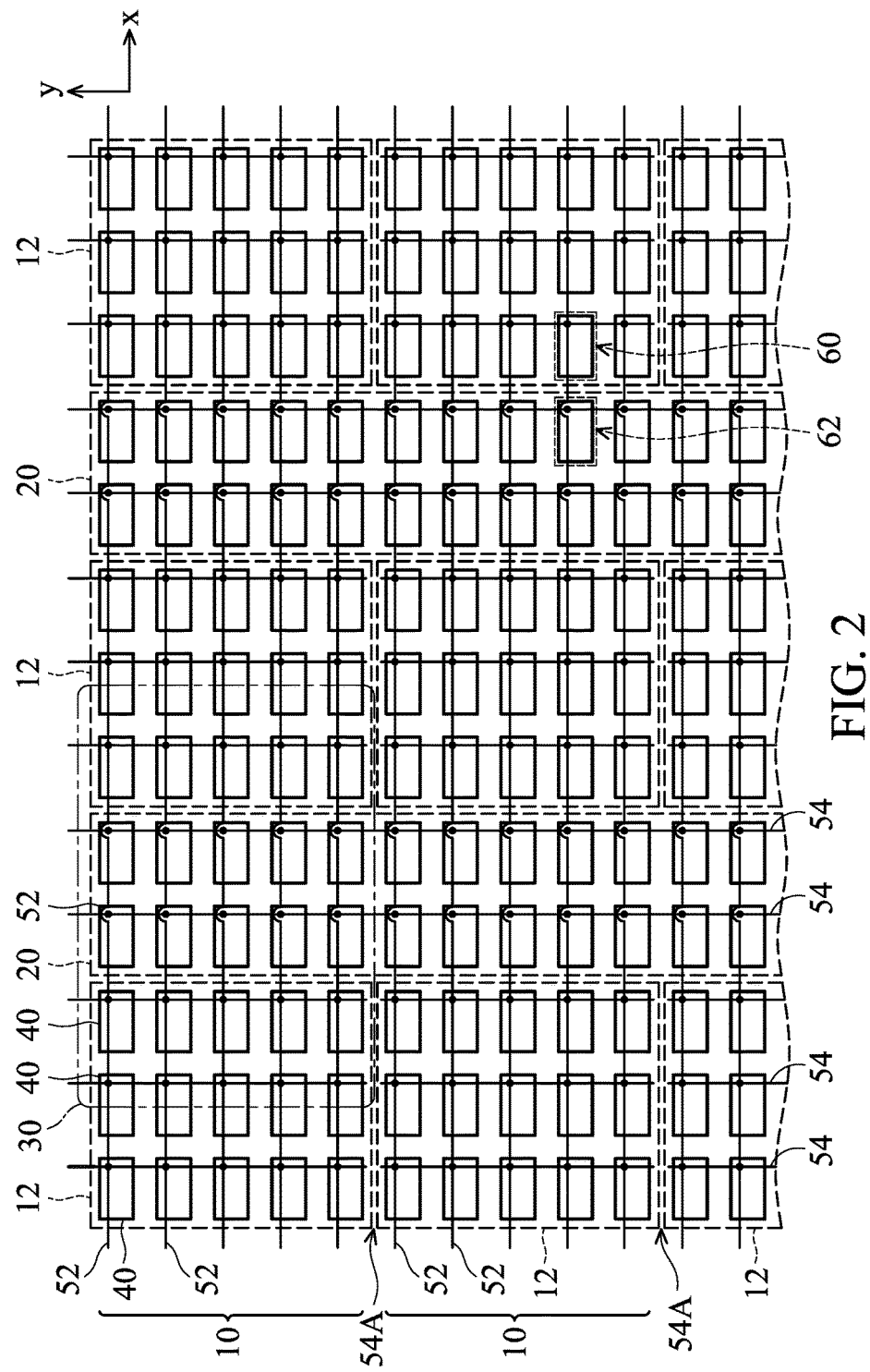
FIG. 2 is a schematic top view of touch sensing electrodes including common electrodes and conducting lines in accordance with an embodiment of the invention.

FIG. 2 is a schematic top view of touch sensing electrodes including common electrodes and conducting lines in accordance with an embodiment of the invention. As shown in FIG. 2, the touch sensing electrodes of this embodiment correspond to several display pixels. The common electrodes 40 may be some elements of the display pixel structure of the display system, and can operate with some other elements of the display system, such as pixel electrodes, for displaying images. It should be realized that the common electrodes 40 correspond to the display pixels of the touch display panel. Moreover, those common electrodes 40 may also be used as the touch sensing electrodes of the touch display panel. For example, the common electrodes 40 can be grouped to form the driving electrode portions 12 and the sensing electrode units 20 of the touch sensing electrodes (FIGS. 1 and 2). In other words, each driving electrode portion 12 may include several common electrodes 40, and the common electrodes 40 of each driving electrode portion 12 can be electrically connected with each other. Similarly, the common electrodes 40 of each sensing electrode unit 20 can also be electrically connected with each other. Accordingly, each common electrode 40 is a multi-function circuit element for operating at both display stage and touch sensing stage. The display stage and the touch sensing stage may be time division multiplexed.

Still referring to FIG. 1 and FIG. 2, the touch display panel 1 of this embodiment further include a plurality of first metal lines 52 along a first direction (such as the x-direction) and a plurality of second metal lines 54 along a second direction (such as the y-direction). Specifically, in each driving electrode portion 12 of the touch sensing electrodes, any two separated common electrodes 40 can be connected with each other via the first metal lines 52 and the second metal lines 54. Moreover, the driving electrode portions 12 in the same row (along the x-direction) can be connected to form the driving electrode unit 10 via the first metal lines 52 (corresponding to the connecting lines 14 in FIG. 1) crossing the sensing electrode units 20. Furthermore, the second metal lines 54 in the adjacent driving electrode portions 12 in the same column (along the y-direction) include open circuits 54A (i.e. the driving electrode units 10 of the adjacent row are electrically isolated from each other). In each sensing electrode unit 20 of the touch sensing electrodes, each common electrode 40 can be connected via the second metal lines 54 with no open circuit. Moreover, the second metal lines 54 in each sensing electrode unit 20 can be connected via an external connection (not shown). Accordingly, the first metal lines 52 along the horizontal direction and the second metal lines 54 along the vertical direction can form the touch pixels 30 of the touch display panel in capacitance manner. For example, at the touch sensing stage, the first metal lines 52 can transmit driving signals to excite the driving electrode units 10, and therefore, an electric field can be formed between the excited driving electrode units 10 and sensing electrode units 20 for generating the touch pixels 30.

Figure 3A:
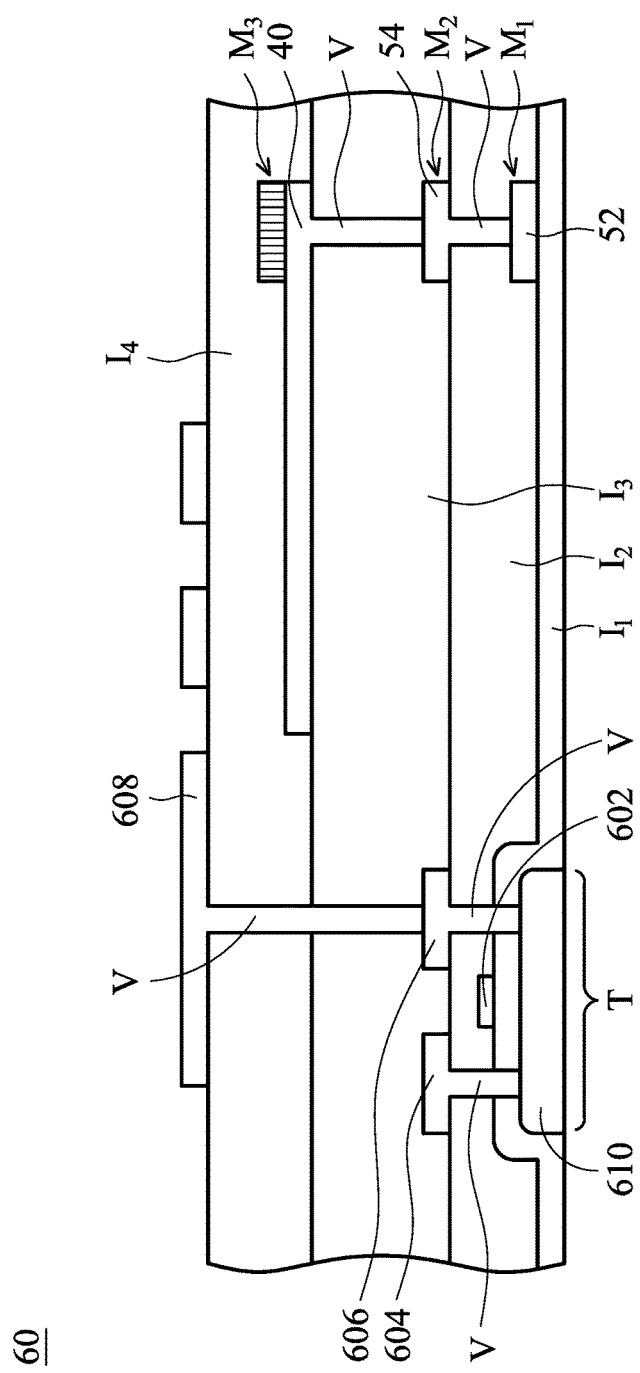
FIG. 3A is a cross-sectional view of a display pixel in one of the driving electrode portions in FIG. 2.

It should be realized that the conducting lines (including the driving electrode units 10 and the sensing electrode units 20) described above are actually formed underneath the common electrodes 40 within the display pixel (laminated) structure. FIG. 3A is a cross-sectional view of a display pixel 60 in one of the driving electrode portions 12 in FIG. 2. As shown in FIG. 3A, the display pixel (laminated) structure of the display pixel 60, from bottom to top, includes a gate line 602 and a first metal line 52 in a first metal layer M1, a source line 604, a drain line 606 and a second metal line 54 in a second metal layer M2, and a common electrode 40 and a pixel electrode 608 formed above the first and second metal layers M1 and M2. Specifically, the gate line 602 and the first metal line 52 are formed on a gate dielectric layer I1 and covered by a gate covering layer I2. The gate dielectric layer I1 is disposed between a semiconductor channel layer 610 and the gate line 602 for forming a thin film transistor (TFT) T. The source line 604, the drain line 606, and the second metal line 54 are formed on the gate covering layer I2, wherein the source line 604 and the drain line 606 can be connected to the semiconductor channel layer 610 through conductive vias V, and the second metal line 54 can be connected to the first metal line 52 through another conductive via V. The source line 604, the drain line 606, and the second metal line 54 are covered by an insulation layer I3. The common electrode 40 is formed on the insulation layer I3 and can be connected to the second metal line 54 through another conductive via V. The common electrode 40 is covered by an insulation layer I4. The pixel electrode 608 is formed on the insulation layer I4 and can be connected to the drain line 606 through another conductive via V.

Moreover, a liquid-crystal layer (not shown) is disposed on the pixel electrode 608 so that a user can view the monitor from the top of the liquid-crystal layer. Furthermore, a substrate (not shown) is disposed at the bottom of the display pixel structure of the display pixel 60 for supporting various elements within the display pixel structure. The substrate can be an organic or an inorganic substrate, wherein the organic substrate may be formed of a plastic material, and the inorganic substrate may be formed of a glass material. The common electrode 40 and the pixel electrode 608 may be formed of a transparent conductive material (such as ITO). The gate dielectric layer I1, the gate covering layer I2, the insulation layers I3 and I4 may be formed of silicon oxide, silicon nitride, silicon oxynitride, organic material, or a combination thereof (the insulation layers I3 is usually an organic insulation layer).

Figure 3B:
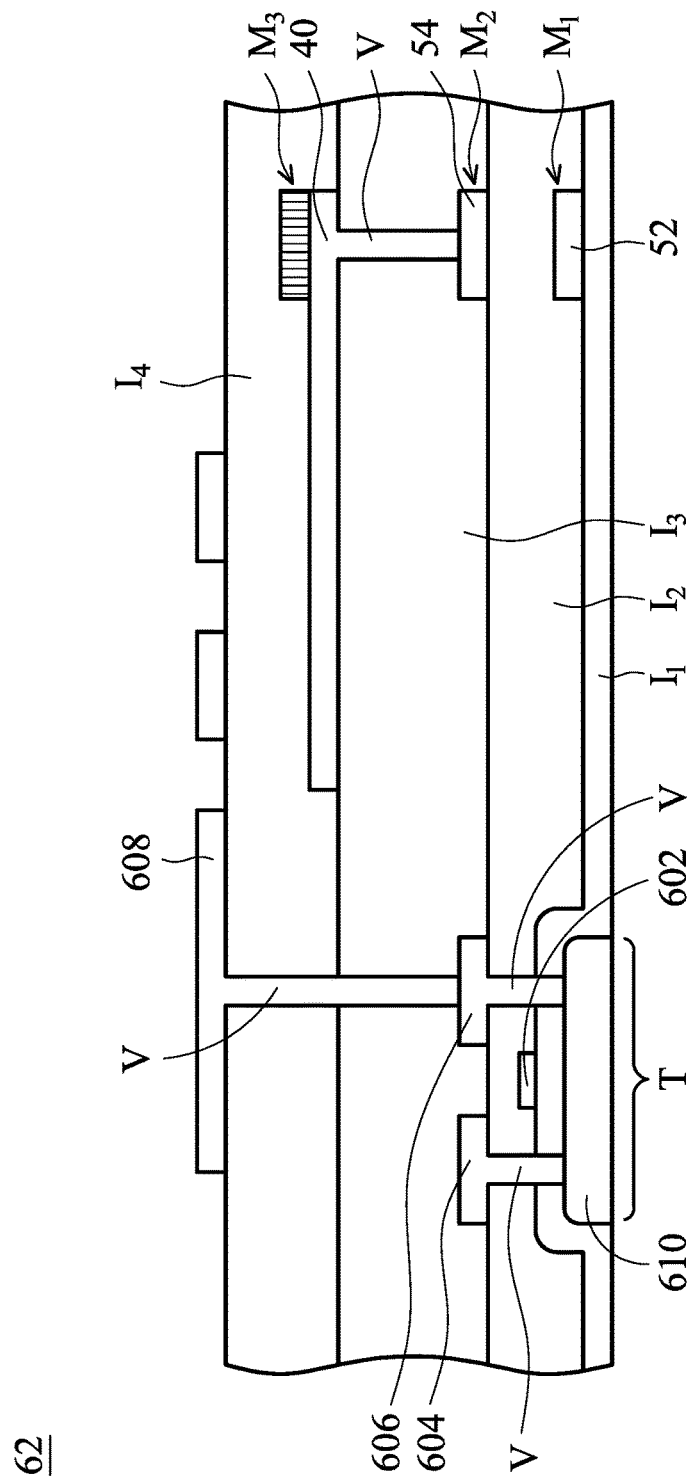
FIG. 3B is a cross-sectional view of a display pixel in the sensing electrode unit in FIG. 2.

FIG. 3B is a cross-sectional view of a display pixel 62 in the sensing electrode unit 20 in FIG. 2. FIG. 3B differs from FIG. 3A in that the second metal line 54 and the first metal line 52 are not electrically connected. As shown in FIGS. 2 to 3B, the first metal line 52, the second metal line 54 and the common electrode 40 in the display pixel 60 in the driving electrode portion I2 (including other elements of the display pixel in the driving electrode portions I2) are electrically connected with each other. In the display pixel 62 in the sensing electrode unit 20 (including other elements of the display pixel in the sensing electrode units 20), only the second metal line 54 is electrically connected to the common electrode 40.

With the structures shown in FIG. 3A and FIG. 3B, the first metal line 52, the second metal line 54, the common electrode 40, and the conductive vias V can be used as the touch sensing structures of the touch display panel for detecting one or more touch positions on the monitor or close to the monitor at the touch sensing stage. Moreover, the TFT T (including the gate line 602, the semiconductor channel layer 610, the drain line 606, and the source line 604 which is used as a data line), the pixel electrode 608, the common electrode 40, and the conductive vias V can be used as the display system circuit of the touch display panel for displaying images on the monitor at the display stage.

Although the structures shown in FIG. 3A and FIG. 3B were designed based on FFS mode panel technology, they may also be designed based on an In-panel Switching (IPS) mode or a Vertical Alignment (VA) mode panel technology.

Still referring to FIG. 3A and FIG. 3B, in this embodiment, the touch display panel further includes a third metal layer M3 formed on the common electrode 40 and electrically connected to the common electrode 40. Specifically, the third metal layer M3 (comprising a metal material) has a resistance less than that of the common electrode 40 (comprising an ITO material). The third metal layer M3 may be formed of Au, Ag, Cu, or an alloy thereof. Otherwise, the third metal layer M3 may be formed by stacked metal layers, such as a Mo/Al/Mo structure. Therefore, the entire resistance of the touch sensing electrodes is effectively reduced, thus improving the drive capability and the sensing sensitivity thereof.

Figure 4:
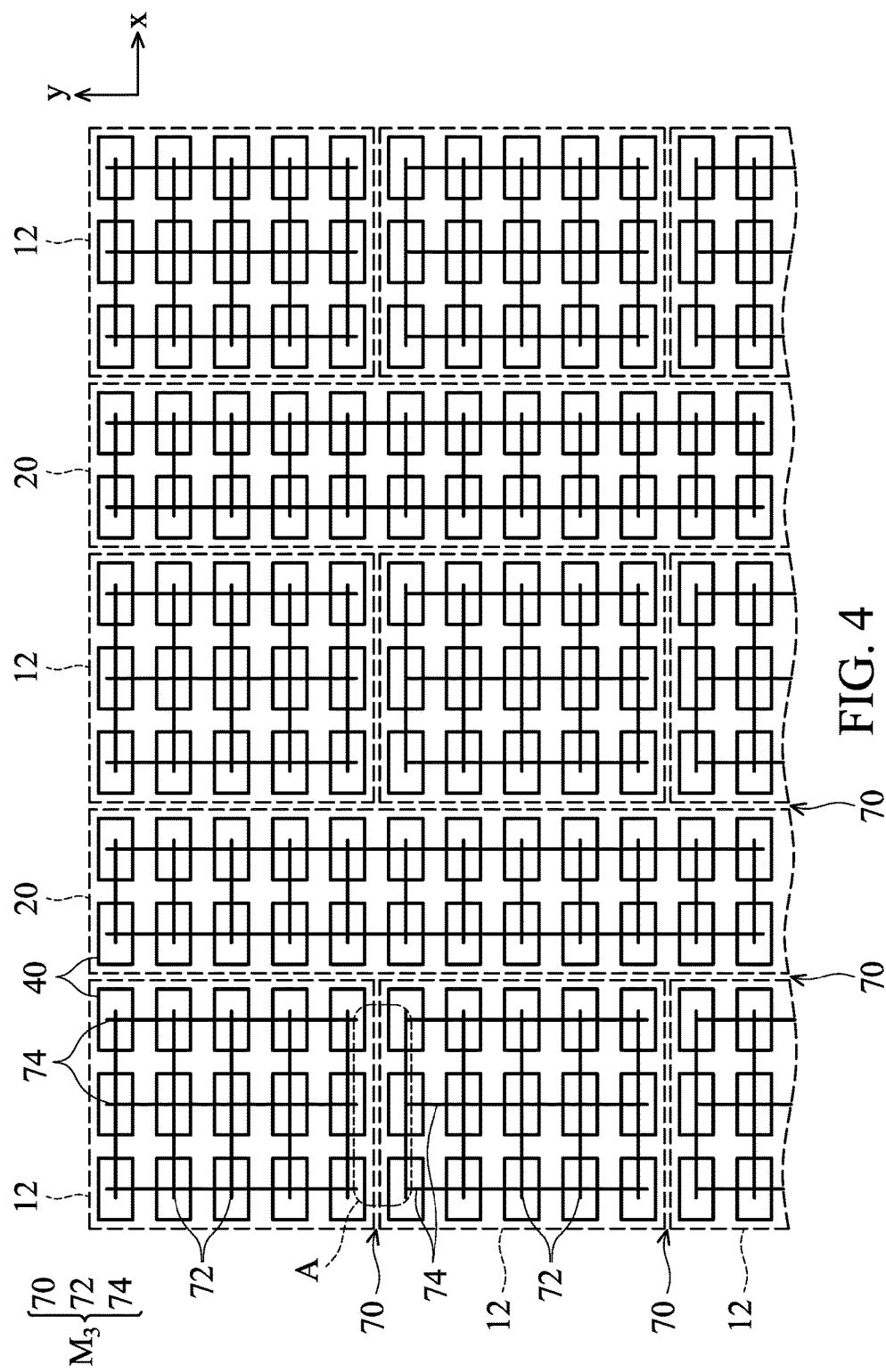
FIG. 4 is a schematic top view of a common electrode layer and a third metal layer of the touch sensing electrodes in accordance with an embodiment of the invention.

FIG. 4 is a schematic top view of a common electrode layer (i.e. a layer structure as indicated by the reference numeral 40 in FIGS. 3A and 3B, consisting of a plurality of common electrodes 40) and a third metal layer M3 in accordance with an embodiment of the invention. As shown in FIG. 4, the third metal layer M3 (the second electrode layer, corresponding to the third metal layer M3 in FIGS. 3A and 3B) on the common electrode layer (the first electrode layer, corresponding to the common electrodes 40 in FIGS. 3A and 3B) includes a plurality of sensing electrodes corresponding to the driving electrode portions 12 and the sensing electrode units 20, separated by opening circuits 70. Each sensing electrode includes a plurality of first conductive lines 72 along a first direction (such as the x-direction) and a plurality of second conductive lines 74 along a second direction (such as the y-direction), wherein the first and second conductive lines 72 and 74 are connected with each other in one of the driving electrode portions 12 or the sensing electrode units 20. In other words, in each driving electrode portion 12 and each sensing electrode unit 20, the first conductive lines 72 and the second conductive lines 74 connect to each common electrode 40. It should be noted that the arrangement of the first conductive lines 72 and the second conductive lines 74 of the third metal layer M3 is substantially aligned with that of the first metal lines 52 and the second metal lines 54 shown in FIG. 2. In some embodiments, the first direction and the second direction may be different and not limited to being mutually perpendicular.

FIGS. 5A to 5F are enlarged views of the part A in FIG. 4 in accordance with some embodiments of the invention. In order to simplify the drawings and focus on the features of the invention, the common electrodes 40 underneath the first conductive lines 72 and the second conductive lines 74 are omitted in FIGS. 5A to 5F.

Figure 5A:
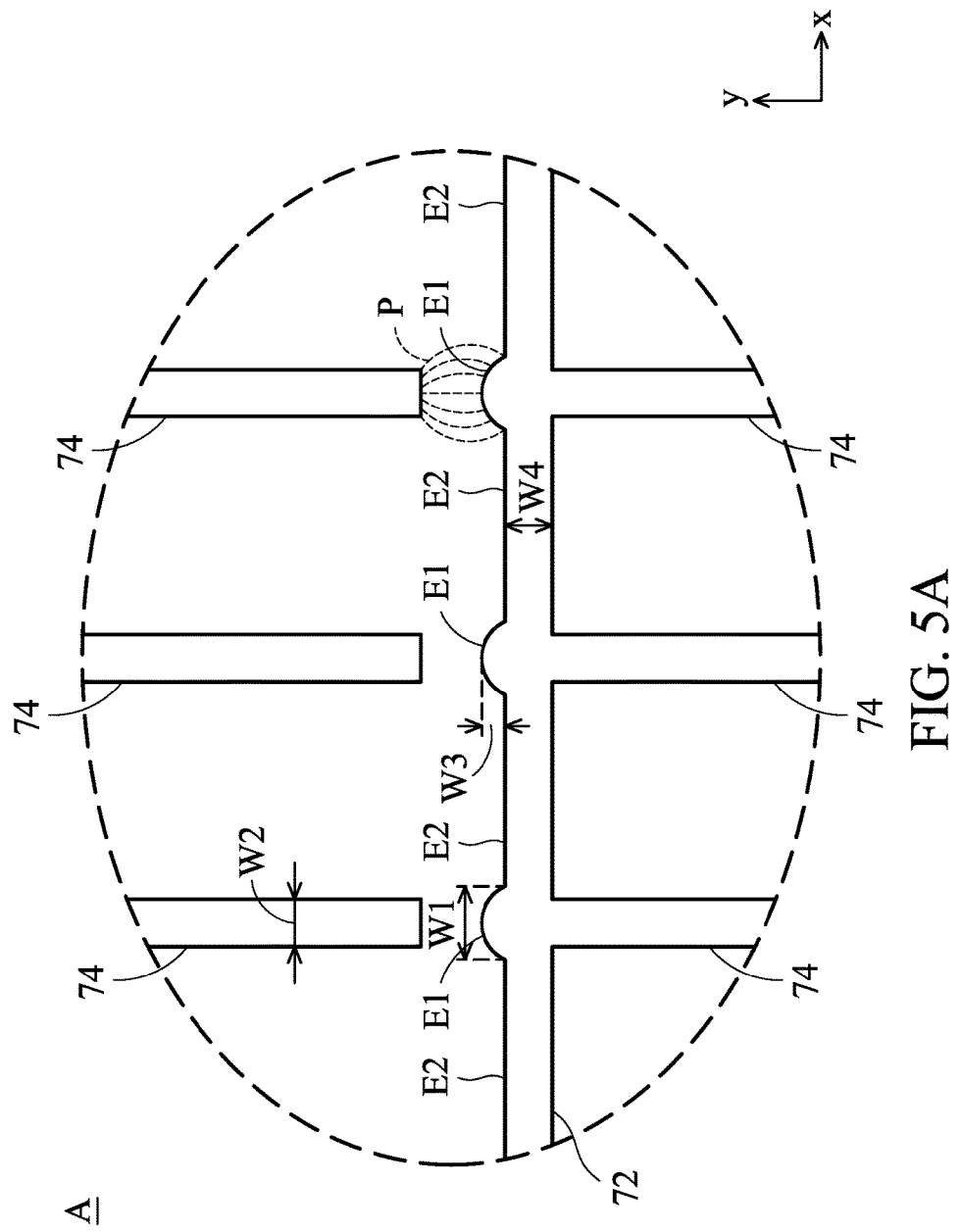
FIGS. 5A to 5F are enlarged views of the part A in FIG. 4 in accordance with some embodiments of the invention.

Referring to FIG. 4 and FIG. 5A, in one (such as the sensing electrode at the lower side of FIG. 5A) of the sensing electrodes in two adjacent driving electrode portions 12 along the second direction (the y-direction), the outermost first conductive line 72 has at least one first edge E1 and at least one second edge E2 connected with the first edge E1. Note that the outermost first conductive line 72 here indicates the first conductive line 72 in one of the sensing electrodes which is closest to the conductive lines in another adjacent sensing electrode. In this embodiment (FIG. 5A), the outermost first conductive line 72 has a plurality of first edges E1 and a plurality of second edges E2 alternatively connected with each other. Moreover, the first edges E1 correspond to the second conductive lines 74 of the other one sensing electrode (such as the sensing electrode at the upper side of FIG. 5A) in the two adjacent driving electrode portions 12 along the second direction.

As shown FIG. 5A, a feature of this embodiment is that the first edge E1 of the outermost first conductive line 72 is a curved line which is protruding relative to the second edge E2 in the second direction (the y-direction). Specifically, the first edge E1 has a first maximum length W1 in the first direction (the x-direction), and the second conductive line 74 corresponding to the first E1 has a line width W2. The line width W2 of the second conductive line 74 substantially equals the first maximum length W1 of the first edge E1. The protruding portion of the first edge E1 relative to the first second edge E2 in the second direction has a second maximum height W3, and the first conductive line 72 has a line width W4 that is greater than the second maximum height W3.

Figure 5B:
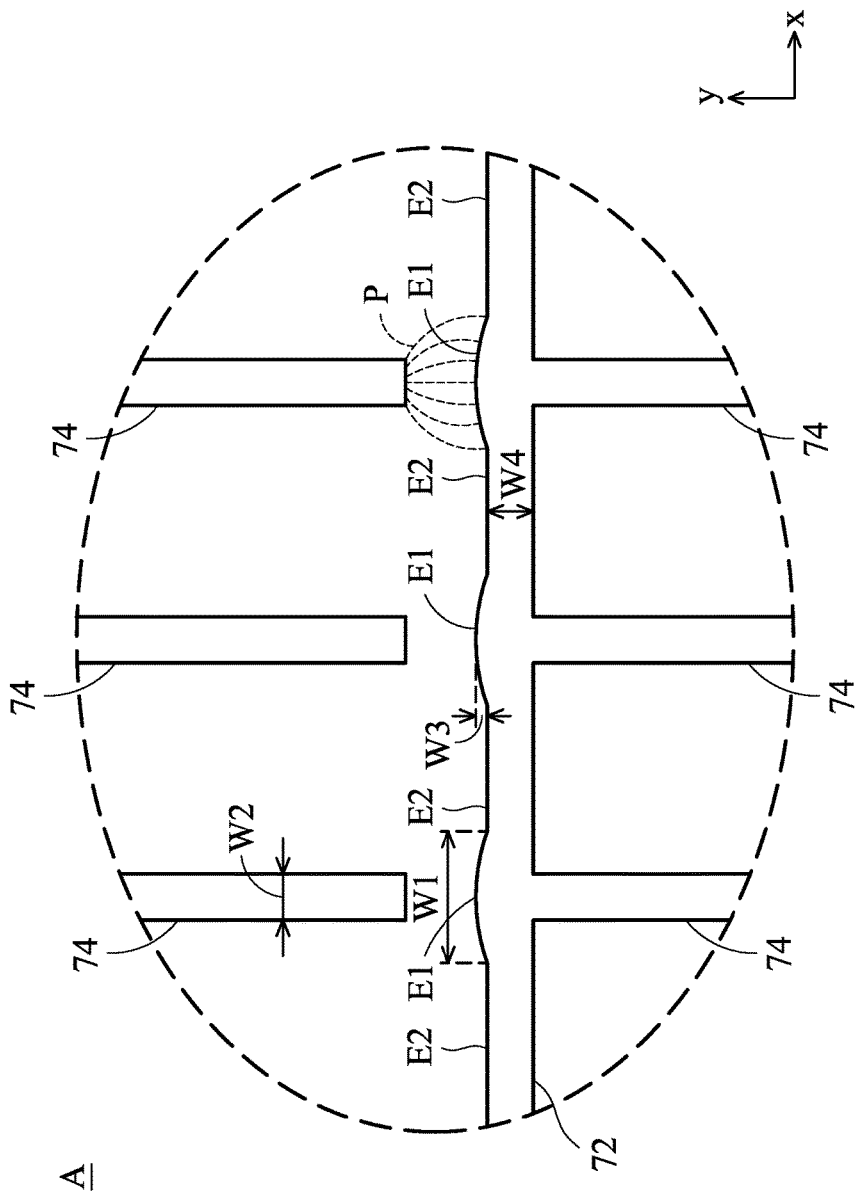

The embodiment of FIG. 5B differs from the embodiment of FIG. 5A in that the first edge E1 of the outermost first conductive line 72 is slightly protruding relative to the second edge E2 in the second direction (the y-direction). Specifically, in the embodiment of FIG. 5B, the first maximum length W1 of the first edge E1 is greater than the line width W2 of the second conductive line 74, and the line width W4 of the first conductive line 72 is also greater than the second maximum height W3 of the protruding portion of the first edge E1 relative to the first second edge E2 in the second direction. It should be noted that the second maximum height W3 shown in FIG. 5B is less than the second maximum height W3 shown in FIG. 5A.

It should be noted that the first edges E1 are flush with the second edges E2 in the traditional design. Supposing all other conditions in the traditional design and the embodiments of FIGS. 5A and 5B to be the same, for example, the distance between the (outermost) first conductive line 72 and the second conductive lines 74 keeps the same, the traditional design merely modifies the first edges E1 of the invention from protruding to flush relative to the second edges E2. Thus, the designs of the embodiments of FIGS. 5A and 5B can make the stray capacitance between the first conductive line 72 and the second conductive lines 72 less than the traditional design mentioned earlier.

Figure 5C:
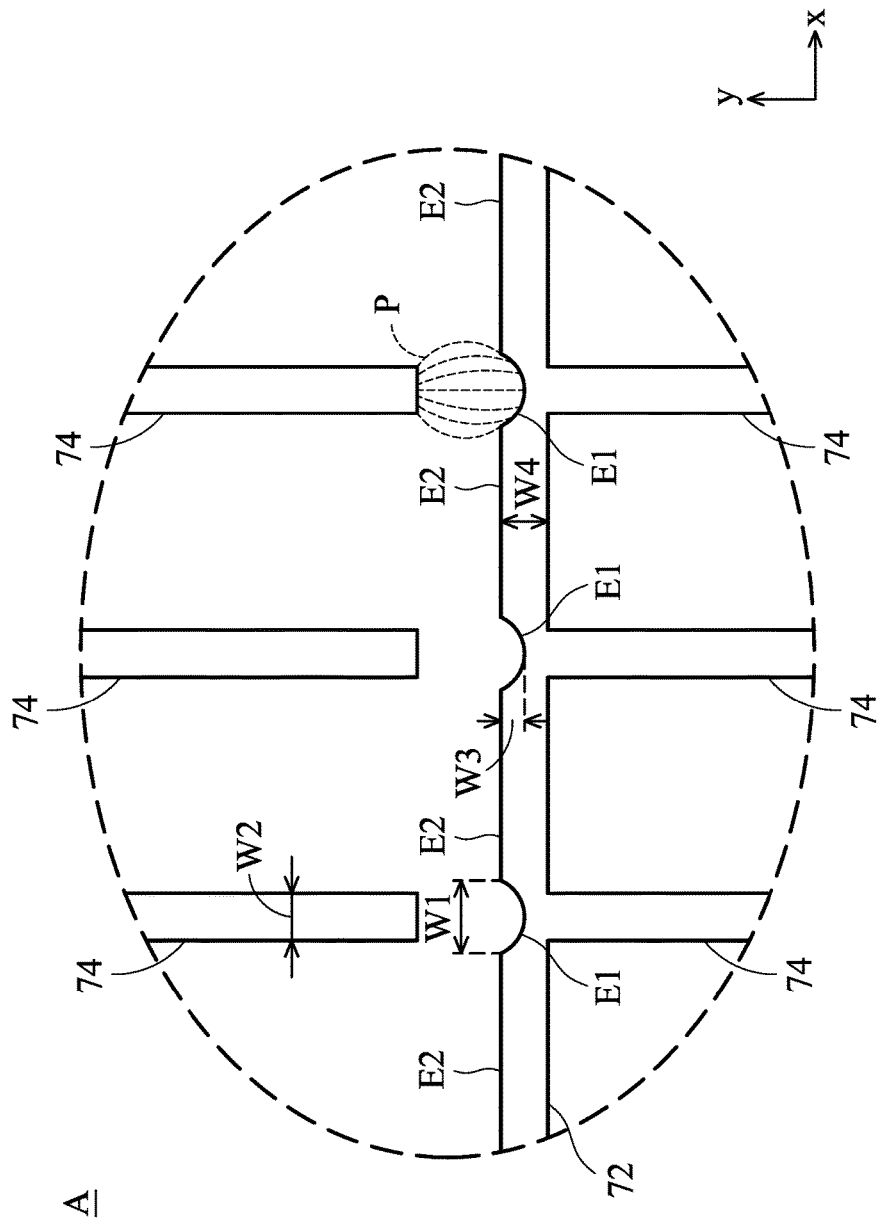

The embodiment of FIG. 5C differs from the embodiment of FIG. 5A in that the first edge E1 of the outermost first conductive line 72 is depressed relative to the second edge E2 in the second direction (the y-direction). Specifically, in the embodiment of FIG. 5C, the first maximum length W1 of the first edge E1 substantially equals the line width W2 of the second conductive line 74, and the line width W4 of the first conductive line 72 is greater than the second maximum height W3 of the depressed portion of the first edge E1 relative to the first second edge E2 in the second direction.

Figure 5D:
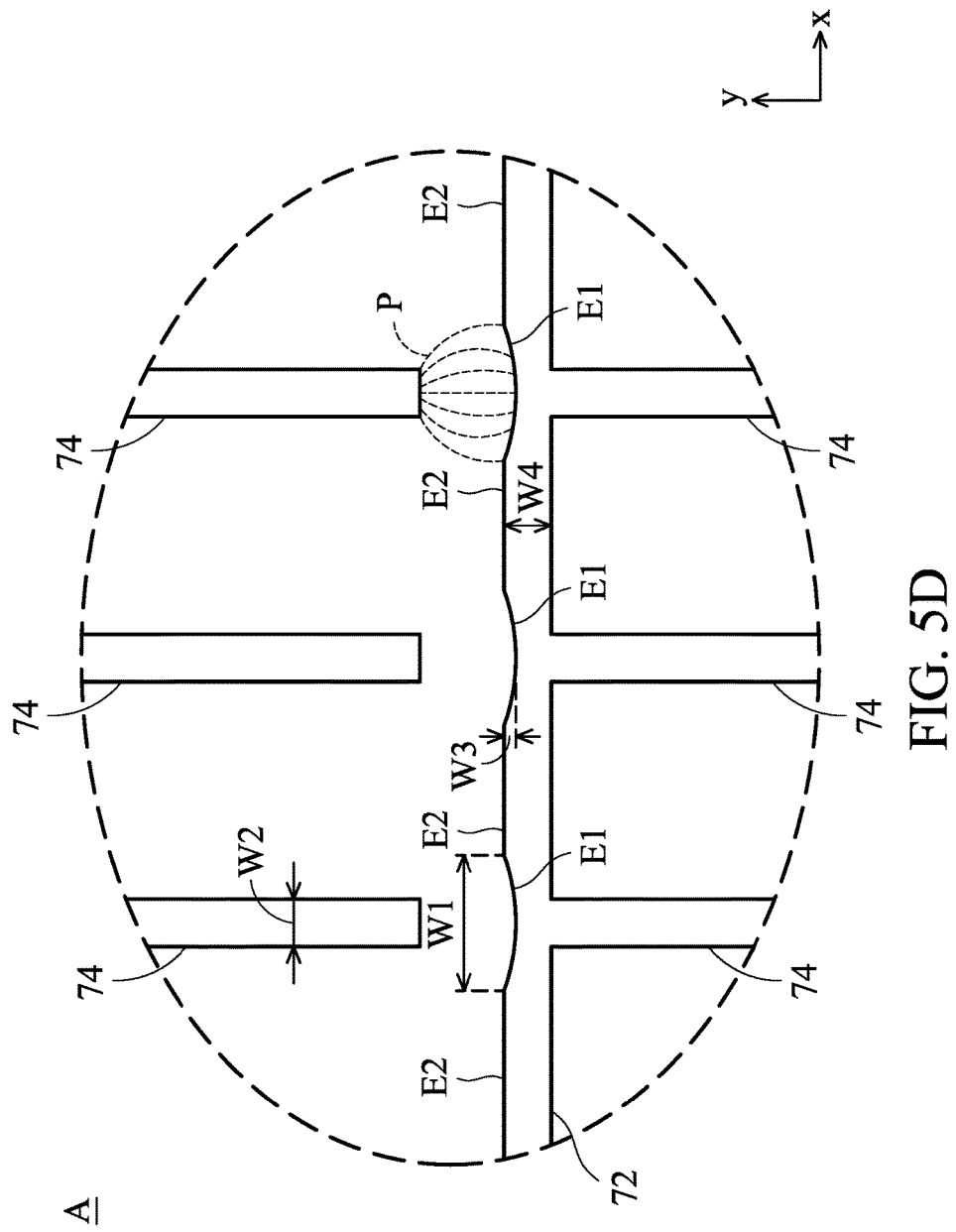

The embodiment of FIG. 5D differs from the embodiment of FIG. 5C in that the first edge E1 of the outermost first conductive line 72 is slightly depressed relative to the second edge E2 in the second direction (the y-direction). Specifically, in the embodiment of FIG. 5D, the first maximum length W1 of the first edge E1 is greater than the line width W2 of the second conductive line 74, and the line width W4 of the first conductive line 72 is also greater than the second maximum height W3 of the depressed portion of the first edge E1 relative to the first second edge E2 in the second direction. It should be noted that the second maximum height W3 shown in FIG. 5D is less than the second maximum height W3 shown in FIG. 5C.

Figure 5E:
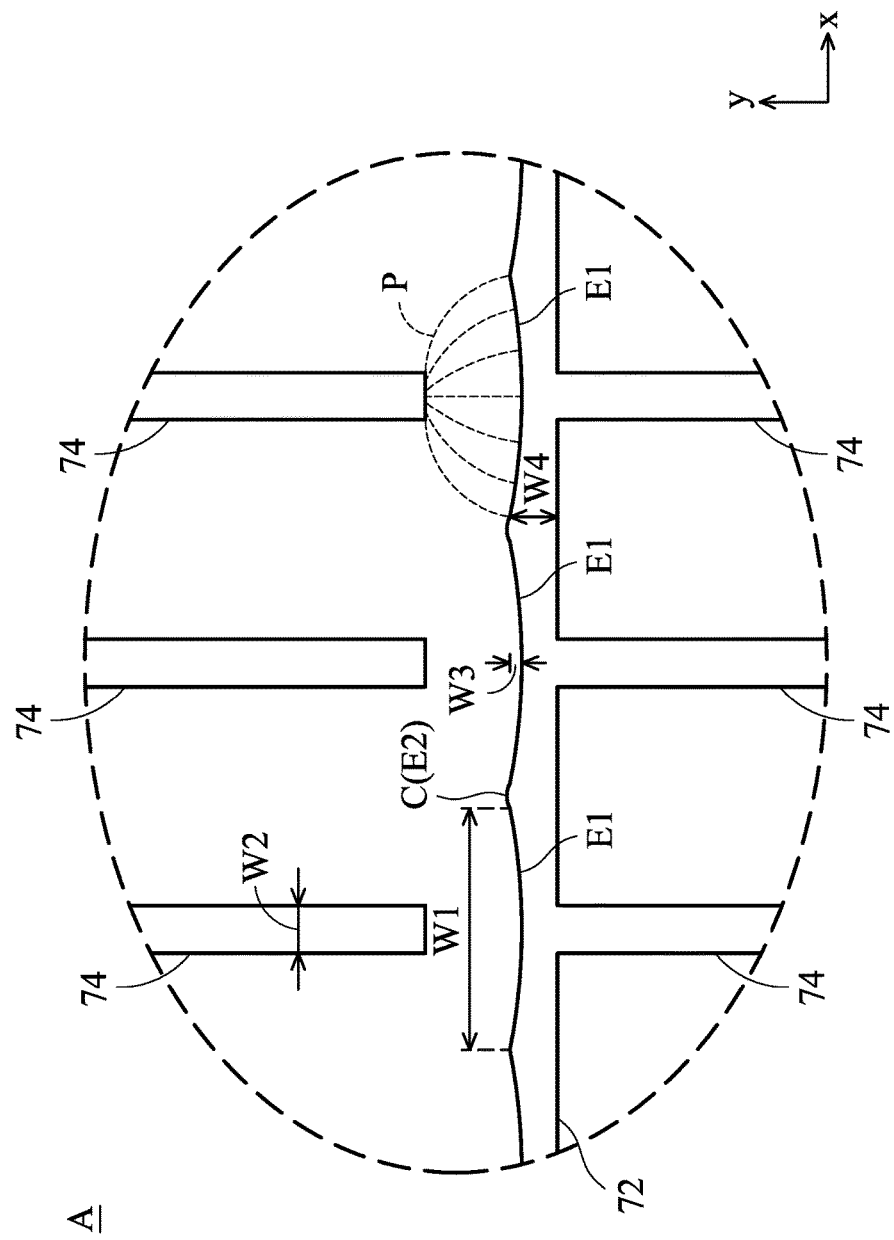

The embodiment of FIG. 5E differs from the embodiment of FIG. 5D in that two adjacent first edges E1 of the outermost first conductive line 72 are directly connected with each other, and the connection C (can be regarded as the second edges E2) thereof are slightly protruding relative to the two first edges E1 in the second direction (the y-direction). Moreover, the connection C and the two first edges E1 are alternatively connected with each other.

It should be noted that the first edges E1 are flush with the second edges E2 in the traditional design. Supposing all other conditions in the traditional design and the embodiments of FIGS. 5C to 5E to be the same, for example, the distance between the (outermost) first conductive line 72 and the second conductive lines 74 keeps the same, the traditional design merely modifies the protruding portions (relative to the first edges E1) of the second edges E2 of the invention to be flush with the lowest portion of the depressed first edges E1. Thus, the designs of the embodiments of FIGS. 5C to 5E can make the stray capacitance between the first conductive line 72 and the second conductive lines 72 less than the traditional design mentioned previously.

Figure 5F:
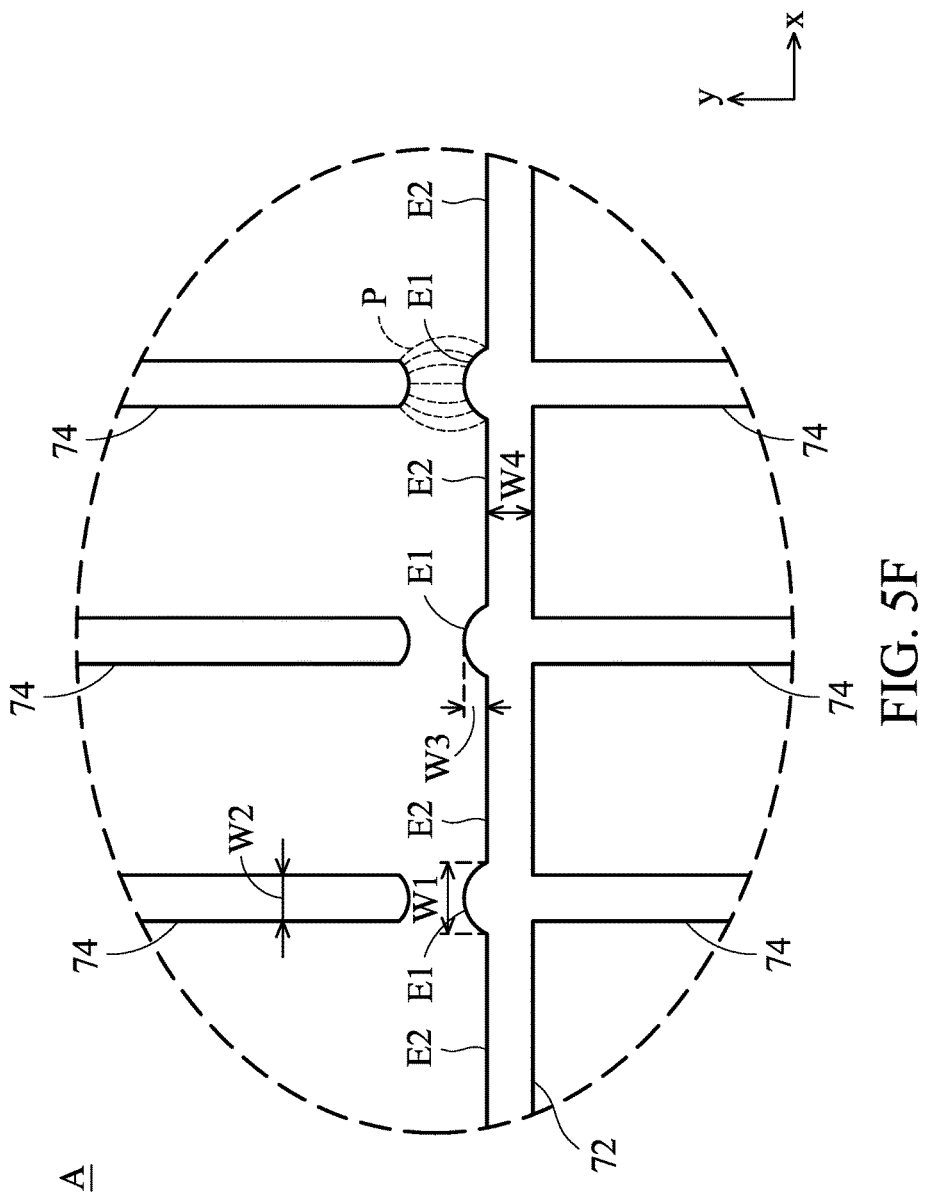

The embodiment of FIG. 5F differs from the embodiment of FIG. 5A in that the second conductive line 74 of the other sensing electrode corresponding to the first edge E1 of the outermost first conductive line 72 also has a curved edge on its end. Similarly, in the embodiments of FIG. 5B to 5E, the second conductive line 74 of the other sensing electrode corresponding to the first edge E1 of the outermost first conductive line 72 may also has a curved edge on its end.

In the structures shown in FIGS. 5A to 5F, compared to the traditional design, the capacitance between the sensing electrodes in two adjacent driving electrode portions 12 of the third metal layer M3 is reduced while the distance therebetween keeps the same. As shown in FIGS. 5A to 5F, the path P of electric lines between the second conductive lines 74 of the sensing electrode (at the upper side) and the (curved) first edges E1 of the outermost first conductive line 72 (at the lower side) is lengthened, such that the capacitance between the adjacent sensing electrodes is reduced. Consequently, the drive capability and the sensing sensitivity of the touch sensing electrodes can be improved.

Figure 6:
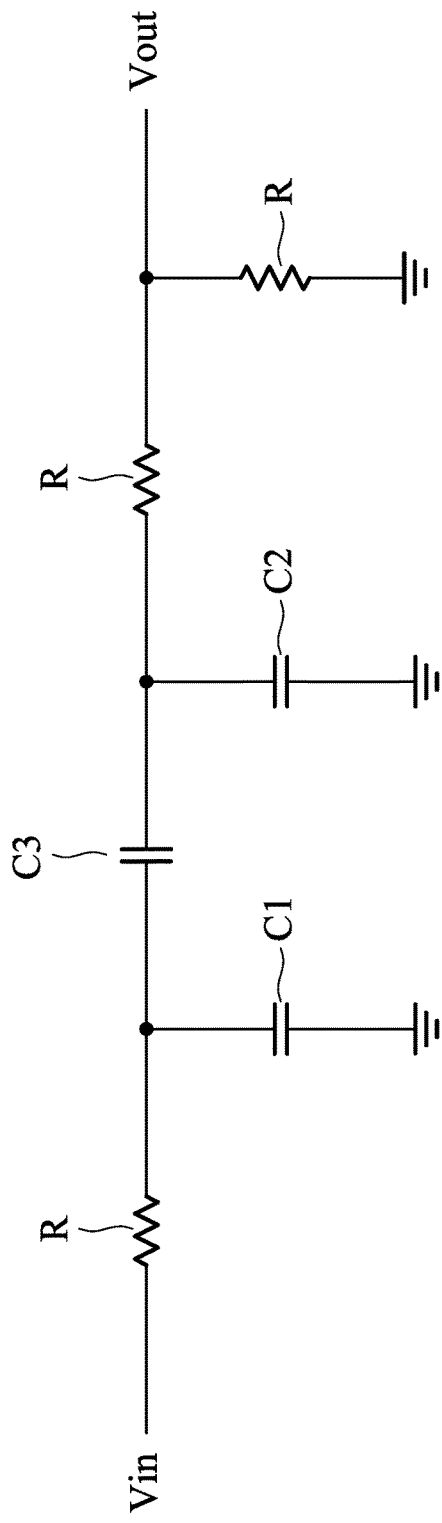
FIG. 6 is an equivalent circuit diagram of a mutual-capacitive touch technology.

FIG. 6 is an equivalent circuit diagram of a mutual-capacitive touch technology, which primarily includes a driving electrode capacitance C1 formed between two adjacent driving electrode portions 12 (FIG. 4), a sensing electrode capacitance C2 formed by the sensing electrode unit 20 (FIG. 4), a mutual-capacitance C3 formed between the adjacent driving electrode portion 12 and sensing electrode unit 20, and several line resistances R. It should be realized that this equivalent circuit substantially is a RC circuit. Therefore, while the stray capacitance C1 mentioned above is smaller, it can facilitate reduction of the charge and discharge rates of the RC circuit, such that the drive capability and the sensing sensitivity of the touch sensing electrodes are effectively improved.

Furthermore, in some embodiments, the first metal lines 52 and the second metal lines 54 (FIG. 2) in the adjacent driving electrode portions 12 may also have the same structural design as the aforementioned first conductive lines 72 and the second conductive lines 74, to further reduce the driving electrode capacitance C1 and improve the drive capability and the sensing sensitivity of the touch sensing electrodes.

Figure 7:
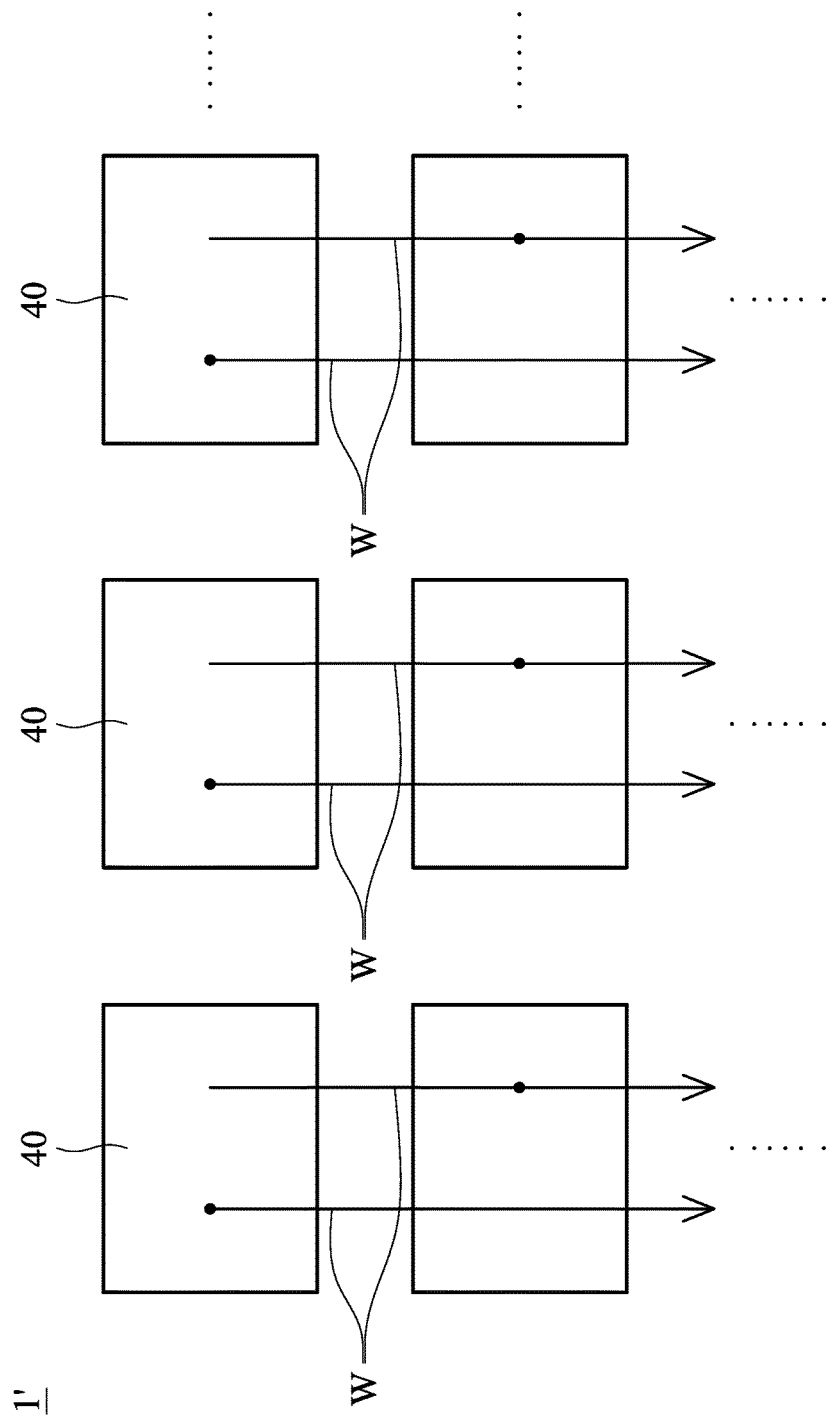
FIG. 7 is a schematic top view of a self-capacitive touch display panel.

Although the touch sensing electrodes in the embodiments have the mutual-capacitive design, they may also have a self-capacitive design. FIG. 7 is a schematic top view of a self-capacitive touch display panel. As shown in FIG. 7, the touch sensing electrodes of the self-capacitive touch display panel 1' include a plurality of common electrodes 40 electrically isolated from each other, which can be individually used to detect the touch position (each common electrode 40 is regarded as a touch pixel). Specifically, each common electrode 40 is connected to a metal line W which is connected to an external control chip (not shown). When an object (such as a finger or conductive stylus) is close to the common electrodes 40, each common electrode 40 and the object can create a capacitance therebetween. This capacitance will affect the charge and discharge rates, such that the touch position of the object can be detected and determined by the external control chip. Similarly, in order to reduce the entire impedance of the touch sensing electrodes in the self-capacitive touch display panel 1', a third metal layer (not shown) may also be provided on the common electrode layer (consisting of the common electrodes 40) and be designed to have curved edges on the unconnected sensing electrodes above the adjacent common electrodes 40. Thus, the capacitance between the adjacent sensing electrodes of the third metal layer is reduced while the distance therebetween keeps the same. Consequently, the drive capability and the sensing sensitivity of the touch sensing electrodes can be improved.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch display panel, comprising:
   a substrate;
   a first electrode layer, disposed on the substrate; and
   a second electrode layer, disposed on the substrate and electrically connected to the first electrode layer, wherein the second electrode layer includes a plurality of sensing electrodes, and each sensing electrode includes a plurality of first conductive lines and a plurality of second conductive lines connected with each other, wherein the first conductive lines are extending along a first direction, and the second conductive lines are extending along a second direction different from the first direction;
   wherein the outermost first conductive line of one of two adjacent sensing electrodes has at least one first edge and at least one second edge connected with the first edge, and the first edge corresponds to one of the second conductive lines of the other one of the two adjacent sensing electrodes, wherein the first edge has a curved shape.

2. The touch display panel as claimed in claim 1, wherein the first edge has a first maximum length in the first direction, and the second conductive line corresponding to the first edge has a line width that is different from the first maximum length.

3. The touch display panel as claimed in claim 2, wherein the line width is less than the first maximum length.

4. The touch display panel as claimed in claim 1, wherein a protruding or depressed portion of the first edge relative to the second edge in the second direction has a second maximum height, and the outermost first conductive line has a line width that is greater than the second maximum height.

5. The touch display panel as claimed in claim 1, wherein the first edge has a first maximum length in the first direction, and the second conductive line corresponding to the first edge has a line width that equals the first maximum length, and wherein a protruding or depressed portion of the first edge relative to the second edge in the second direction has a second maximum height, and the outermost first conductive line has a line width that is greater than the second maximum height.

6. The touch display panel as claimed in claim 1, wherein the outermost first conductive line of one of two adjacent sensing electrodes further has a plurality of first edges and a plurality of second edges, and the first edges and the second edges are arranged alternatively and connected with each other.

7. The touch display panel as claimed in claim 6, wherein the first edges correspond to the second conductive lines of the other one of the two adjacent sensing electrode.

8. The touch display panel as claimed in claim 1, wherein the outermost first conductive line of one of two adjacent sensing electrodes further has a plurality of first edges and a plurality of second edges, the first edges being adjacent to and connected with each other, and the second edges are used as connections between the first edges and are protruding relative to the first edges in the second direction, wherein the connections and the first edges are alternatively connected with each other.

9. The touch display panel as claimed in claim 1, wherein the second conductive line corresponding to the first edge has a curved edge.

10. The touch display panel as claimed in claim 1, wherein the first electrode layer comprises a transparent conductive material, and the second electrode layer comprises a metal material.

* * * * *